(12) United States Patent
Gurney

(10) Patent No.: US 7,050,436 B1
(45) Date of Patent: May 23, 2006

(54) DEVICE AND METHOD FOR PROCESSING A STREAM OF DATA

(75) Inventor: Howard Gurney, Briston (GB)

(73) Assignee: STMicroelectronics Limited, Bristol (GB)

( * ) Notice: Subject to any disclaimer, the term of this patent is extended or adjusted under 35 U.S.C. 154(b) by 1017 days.

(21) Appl. No.: 09/589,627

(22) Filed: Jun. 7, 2000

(30) Foreign Application Priority Data

Jun. 8, 1999 (GB) .................................. 9913326

(51) Int. Cl.
*H04L 12/56* (2006.01)

(52) U.S. Cl. ...................................... 370/394; 370/487

(58) Field of Classification Search ................ 370/389, 370/392, 470–471, 474, 476, 535–536, 487, 370/503, 509, 512, 514; 348/464–469, 510, 348/512, 516, 500, 515; 375/240.01; 380/210, 380/212; 345/723; 725/60–61, 86–88, 100, 725/104, 151; 386/46, 70
See application file for complete search history.

(56) References Cited

U.S. PATENT DOCUMENTS

| | | | | |
|---|---|---|---|---|
| 5,146,564 A | * | 9/1992 | Evans et al. .................... 710/57 |
| 5,579,317 A | * | 11/1996 | Pang et al. .................. 370/392 |
| 5,619,337 A | | 4/1997 | Naimpally .................... 386/83 |
| 5,642,153 A | | 6/1997 | Chaney et al. ................. 348/7 |
| 5,650,825 A | * | 7/1997 | Naimpally et al. ......... 348/465 |
| 5,742,361 A | | 4/1998 | Nakase et al. ............... 348/845 |
| 5,754,651 A | | 5/1998 | Blatter et al. .................. 380/20 |
| 5,856,973 A | * | 1/1999 | Thompson .................. 370/389 |
| 6,061,399 A | * | 5/2000 | Lyons et al. ................. 375/240 |
| 6,169,843 B1 | * | 1/2001 | Lenihan et al. ............... 386/46 |
| 6,205,180 B1 | * | 3/2001 | Dutey .................... 375/240.25 |
| 6,236,432 B1 | * | 5/2001 | Lee ........................ 375/240.26 |
| 6,477,317 B1 | * | 11/2002 | Itokawa ....................... 386/95 |
| 6,512,882 B1 | * | 1/2003 | Teunissen .................... 386/70 |
| 6,584,125 B1 | * | 6/2003 | Katto ......................... 370/537 |

FOREIGN PATENT DOCUMENTS

| | | |
|---|---|---|
| EP | 0784401 | 7/1997 |
| EP | 0893913 | 1/1999 |
| EP | 0905983 | 3/1999 |
| EP | 0 933 927 A1 | 8/1999 |
| WO | WO96/37983 | 11/1996 |
| WO | WO 98/43415 | 10/1998 |

* cited by examiner

*Primary Examiner*—Man U. Phan
*Assistant Examiner*—Toan Nguyen
(74) *Attorney, Agent, or Firm*—Lisa K. Jorgenson; Timothy L. Boller; Seed IP Law Group PLLC (57) ABSTRACT

This invention relates to a device and method for producing a stream of data. The device receives a stream of data as an input and includes means for identifying a portion of the input stream and outputting the identified portion. The device also includes means for selecting a further portion of the input stream and outputting the selected portion. The relative timing between the two output streams is monitored and maintained with respect to the input stream.

33 Claims, 4 Drawing Sheets

DEVICE AND METHOD FOR PROCESSING A STREAM OF DATA

TECHNICAL FIELD

The present invention relates to a device and method for processing a stream of data. In particular, but not exclusively, the device is a digital video device such as a set top box which is arranged to receive a transport stream as the stream of data.

BACKGROUND OF THE INVENTION

Set top boxes are used, for example in the context of cable television and satellite television. A set top box is arranged to receive television programs from a satellite or via a cable and to output a program which is displayed on a television screen or recorded on a video recorder. With both cable and satellite television, an input stream is received at an interface of the set top box. The input stream is generally scrambled and comprises audio and visual information about several different television programs, the information being time multiplexed together. Control information will also be included in the received input stream. Information relating to a television program selected by the user is demultiplexed by the set top box from the input stream to provide the selected program which is then output by the set top box to for example a television screen, video recorder or indeed any other type of recorder.

It has been proposed to output a copy or a modified version of the input stream via a further output interface. This copy or modified version of the input stream can be sent to another device capable of processing that stream.

In the current proposals, the copy or modified version of the input stream will include the data from the programs of interest. Thus for a packet of the input stream, only some of the bytes of the data of the packet may be related to a program of interest and be output via the further interface. The required bytes of the packet will be at the beginning of the output packet with the remaining bytes of the packet filled with an indication that those bytes are not required or are invalid bytes. The data of the bytes which are not required are discarded and are not output via the further interface.

This has the disadvantage that the relative timing of the data bytes relating to a required program in the output stream will differ from that of the input stream even if the packet start timing is the same for the input, and output streams. In other words, the relative timing of the bytes within the packet will differ.

It has been appreciated by the inventor that this may be undesirable. A processor connected to the further interface may be unable to process correctly the bytes because the relative timing of the desired bytes has changed. Additionally, the processor connected to the further interface may not be able to process the data bytes efficiently because all of the desired data bytes are bunched together instead of being distributed over the whole of the data packet.

Accordingly, it is an aim of certain embodiments of the present invention that this problem be addressed.

SUMMARY OF THE INVENTION

According to one aspect of the present invention there is provided a device for receiving a stream of data, said device comprising means for selecting a plurality of portions of data from said stream of data to be output from said device; determining means for determining the relative timing of said plurality of portions of data; and output means for outputting the selected data, wherein the plurality of portions of data output by said output means have the same relative positions as the plurality of portions of data in the received stream of data.

As the timing between the input and output data is maintained, the problems of the prior art can be circumvented.

The stream of data may comprise a plurality of data packets and the plurality of portions of data may occur within a packet. Each portion of data may comprise a byte of data.

Means are preferably provided for identifying which of a plurality of data packets comprise data to be output by the output means. Storage means may be provided for storing information for each portion of a packet indicating if that portion of data is to be output from said output means. This information may be a data portion valid signal, for example a byte valid signal. The storage means may be a first-in first-out buffer.

Each data packet may include information identifying the beginning of said packet and means may be provided for identifying the beginning of each packet. The means for identifying the beginning of a packet may provide an output for controlling the timing of the output of the selected data by said output means. In this way, a relationship between the timing of the input data and the output data can be maintained. Preferably, a fixed latency is provided between the input plurality of portions of data received by the device and the output of those selected portions of data.

Means may be provided for storing the selected portions of data. That means may be in the form of a FIFO. The means for storing the selected portions of data preferably only store the selected portions of data, the other portions of data being discarded.

The output means may comprise a state machine which controls the output of the selected portions of data. The state machine may receive outputs from the means for storing said selected portions of data, the means for identifying the beginning of a packet and the means for storing information on each packet of data.

The input stream may conform to the MPEG-2 standard. The device as described hereinbefore may be incorporated in a set top box.

According to a second aspect of the present invention, there is provided a method of processing a stream of data comprising the steps of receiving a stream of data; selecting a plurality of portions of data from said stream of data to be output; determining the relative timing of said plurality of portions of data; and outputting the selected data, wherein the plurality of portions of data output have the same relative positions as the plurality of portions of data in the received stream of data.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE INVENTION

Figure 1:
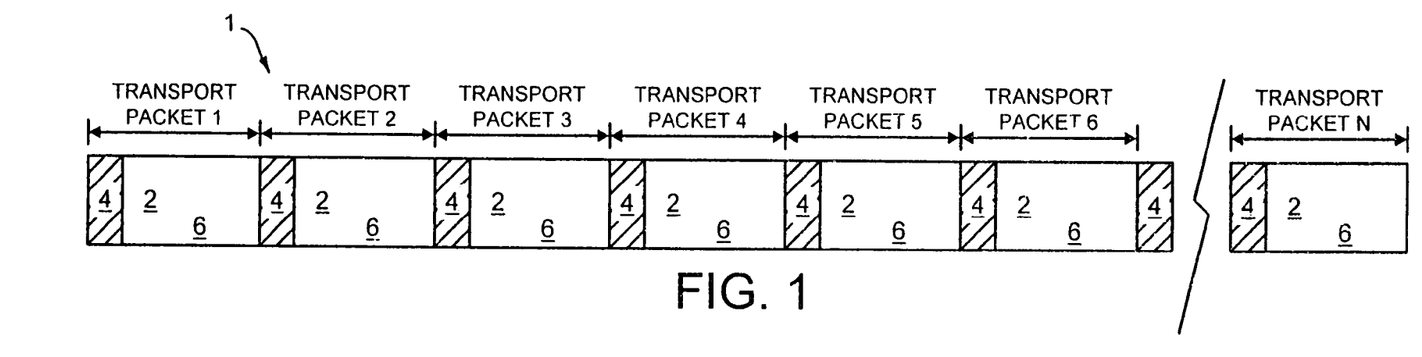
FIG. 1 schematically shows a transport stream.

FIG. 1 illustrates a portion of the transport stream 1 (data stream) which is composed of a series of N transport packets 2. Each transport packet 2 comprises a transport packet header 4 and a transport packet payload 6. The transport stream is a bit stream which carries in the transport packet payloads 6 of information for recreating, for example, a number of different television programs. The transport stream is formed by source encoding the television programs. The transport stream is then typically channel encoded for transmission for example by satellite or cable and channel decoded at a respective receiver to reproduce the transport stream. The transport stream is then source decoded to recreate a selected one of the different television programs transmitted by the transport stream 1.

Each particular television program may require four different types of information in order to recreate the program. That information may consist of audio information, video information, descrambling information and tables of program information. Each transport packet 2 is associated with one or more than one television program. The individual transport packets are time division multiplexed to form the transport stream and allow the real-time recreation of any of the different television programs from the transport stream.

To recreate a television program, the transport stream 1 is demultiplexed to recover only the transport payloads 6 of audio information, video information, descrambling information and tables of program information which are associated with a selected television program. The recovered payloads are then decoded to recreate the television program. In general, only the payloads will be scrambled and not the headers.

Figure 2:
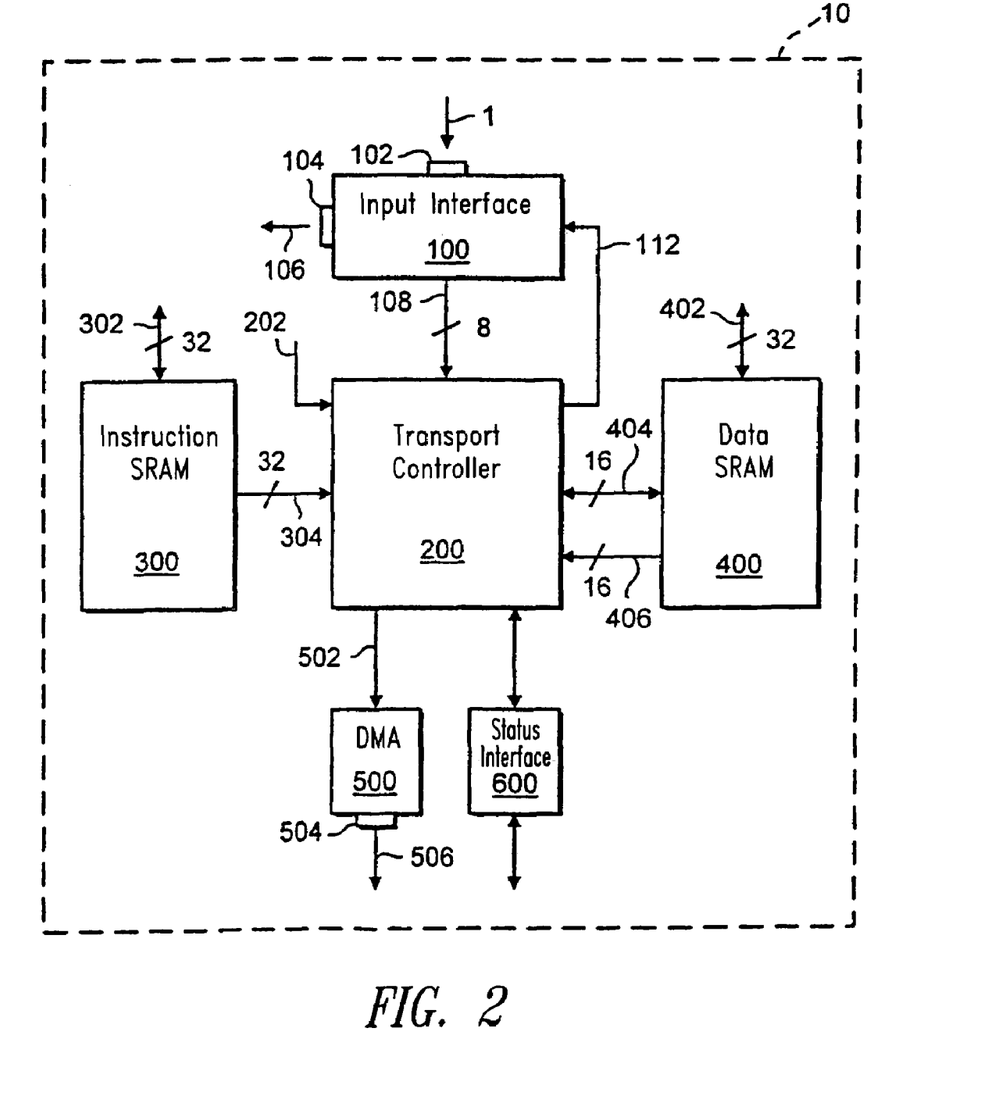
FIG. 2 shows a schematic diagram of a programmable transport interface embodying the present invention.

According to one digital broadcasting standard DVB (digital video broadcasting) each of the transport packets is 188 bytes long of which the transport packet header is four bytes long. The payload 6 contains packetizing information in the form of 184 bytes. These latter bytes contain, for example, information for recreating a number of different television programs as discussed hereinbefore. With this known standard, the audio and visual information in the payloads 6 have been packetized and encoded in accordance with the MPEG-2 compression standard. A programmable transport interface 10 (PTI), which is illustrated in FIG. 2 is used to process the received transport stream 1 and produce a data output stream 506 suitable for reconstitution as a television program after MPEG-2 decoding by MPEG-decoders 702 (see FIG. 4). The programmable transport interface 10 is included in a receiver or set top box 701 which receives the transport stream 1.

The transport packet header 4 contains a synchronization byte which identifies the beginning of each transport packet 2. The transport packet header 4 also contains a packet identification PID which identifies the information type(s) and the television program(s) associated with the transport packet payload 6. The transport packet 2 also contains information identifying the source encoding type(s) of the transport packet. The transport packet header 4 including the synchronization byte and the PID is not scrambled. The transport packet payload 6 may itself be scrambled.

The programmable transport interface 10 shown in FIG. 2 also produces an alternative output stream 106 which will be described in more detail hereinafter. This alternative output stream 106 may be an output derived from the transport stream. The alternative output stream contains a portion of the transport stream 1. This portion may be unmodified or may have been modified for example by encryption or by changing the communication standard or protocol under which the transport stream has been prepared.

The programmable transport interface PTI 10 performs the following functions amongst others. The PTI 10 uses the synchronization byte to identify the start of a transport packet 2 and uses the packet identification PID to identify the type(s) of information contained in the packet and the television program(s) it represents. The PTI 10 descrambles if necessary, the transport packet payload 6 and demultiplexes the transport stream 1 to produce the data output stream 506, this data output stream comprising a stream of audio information associated with the selected television program, a stream of video information associated with the selected television program and tables of program information associated with the selected television program. The PTI 10 then outputs these streams to the necessary decoders 702 (FIG. 4) and/or to buffers in an external memory (not shown) to reproduce the selected television program.

The PTI 10 comprises six functional blocks: the input interface 100; the transport controller 200; the instruction SRAMs (static random access memory) 300; the data SRAM 400; the multichannel DMA (direct memory access) 500; and the controller and status register interface 600. The input interface has a transport stream input interface 102 for receiving the transport stream 1 and an alternative stream output interface 104 for outputting the alternative output stream 106. The function of the interface 100 will be described in more detail hereinafter.

The transport controller 200 receives from the input interface 100 via interconnect 108 the transport packet header 4 of the transport packet arriving at the transport stream input interface 102. The transport controller 200 uses the packet identification PID in the transport packet header 4 to determine whether the transport packet 2 entering the input interface 100 via the transport stream input interface 102 is associated with the selected television program. If it is not, the received transport packet 2 is discarded. If it is, the transport controller 200 controls the input interface 100 to descramble and supply the transport packet payload 6 via the interconnect 108 to the transport controller 200. The transport controller 200 may pass the payload 6 associated 7 with audio or video information for the selected program straight to the multi-channel) DMA 500 via the interconnect 502. Alternatively, part of the payload 6 may be output, possibly after processing by the transport controller 200, via the alternative stream output interface 104. This will be discussed in more detail hereinafter.

The transport controller 200 comprises a processor in the form of a transport controller core 124 (see FIG. 3) which reads instructions from the instruction SRAM 300. The transport controller 200 is connected to the SRAM 300 by interconnect 304 and reads instructions from the SRAM 300 via the interconnect 304. A system processor 700 (see FIG. 4) may read and write to the instruction SRAM 300 via the interface 302 allowing the transport controller instructions to be varied.

Figure 4:
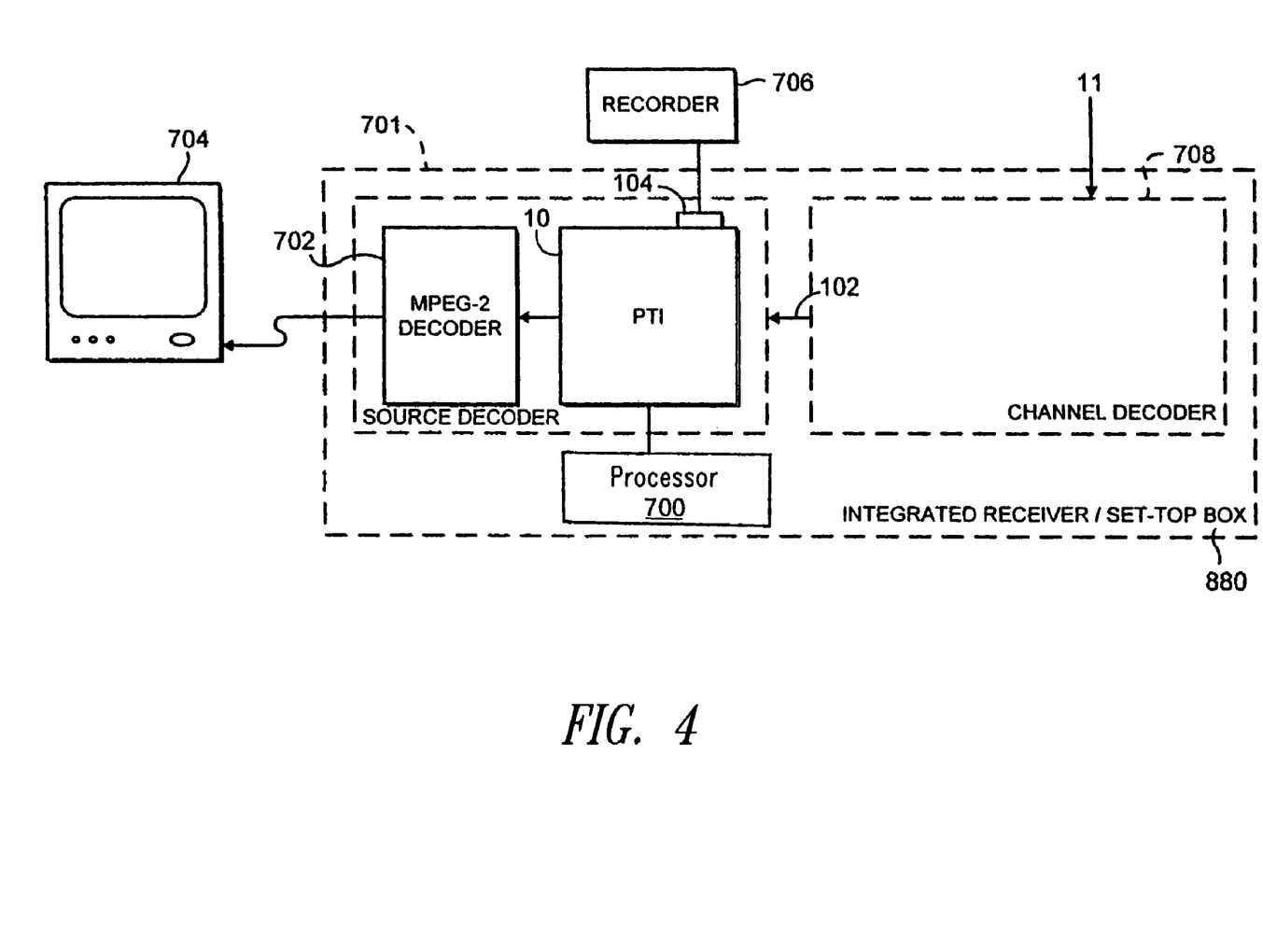
FIG. 4 shows a set top box incorporating the programmable transport interface of FIG. 2 and which is connected to a recorder and a screen.

The data SRAM 400 can be read from and written to by the transport controller core 124 of the transport controller 200 via the interconnect 404. A search engine (not shown) within the transport controller 200 reads from the data SRAM 400 via interconnect 406. The search engine associates a pointer with each of the program identification PIDs in the transport packet headers 4. The data SRAM 400 stores, at a location indicated by the pointer, information associated with the transport packet 2 having a particular PID. This information is read over interconnect 406 and it enables the transport controller to control the production of input interface control signals 112 and the processing of the bits received on interconnect 108. The data SRAM 400 can be written to and read from the system processor 700 via the interface 402. The transport controller 200 produces a transport controller output which is supplied to the multichannel DMA 500 via interconnect 502. The multichannel DMA 500 has an external memory interface 504 which supplies the data output stream 506 to decoders 702 or an external memory.

Figure 3:
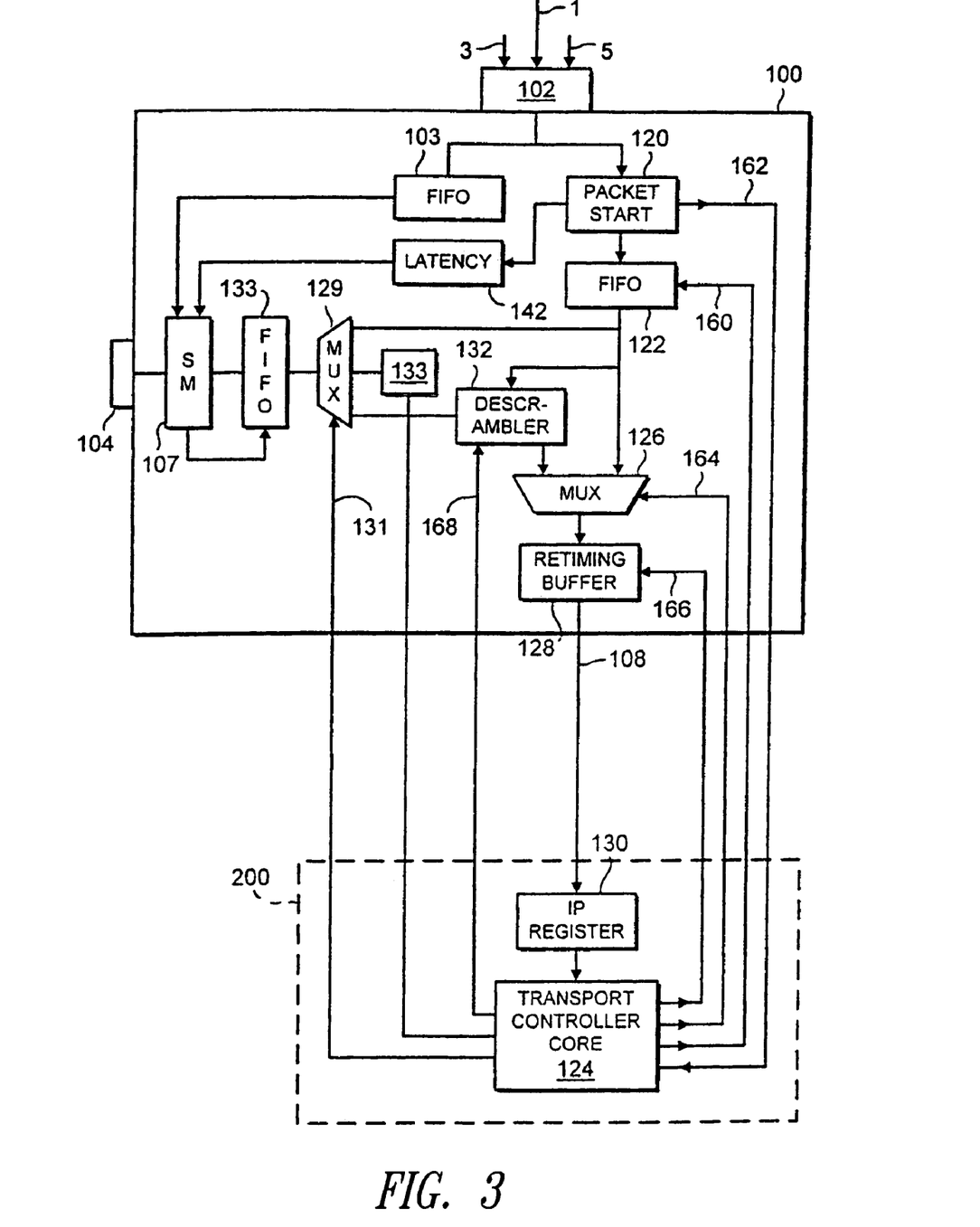
FIG. 3 shows a block diagram of part of the input interface and part of the transport controller of the programmable transport interface shown in FIG. 2.

Reference will now be made to FIG. 3 which shows part of the input interface 100 and part of the transport controller 200 in more detail. The input interface 100 is arranged to receive the transport stream 1 via transport stream interface 102. The input interface 102 also receives a byte clock 3. The transport stream received via transport interface 102 is passed to a packet start block 120. The packet start block 120 is arranged to look for the synchronization byte of each transport packet 2 which identifies the beginning of each packet. In the start-up mode, the packet start block 120 looks at the input stream until it finds a synchronization byte. In order to establish that what is located is a synchronization byte and not, for example, part of the payload 6 which happens to contain a sequence of bits identical to that of the synchronization byte, the packet start block 120 checks to see that a synchronization byte is present a predetermined number of bytes later, i.e., at a location corresponding to the beginning of the next packet.

In this embodiment, the packet start block 120 only checks for the occurrence of two synchronization bytes spaced apart by a predetermined number of bytes corresponding to the length of the packet. However, in other embodiments of the present invention, the packet start block 120 can check that the synchronization byte occurs a predetermined number of times, each occurrence of the synchronization byte being separated by the number of bytes contained in each transport packet. For example, in the DVB standard, the packet start block would check to see that a synchronization byte occurs every 188 bytes in order to confirm that the beginning of the transport packet has been identified. Once the packet start block 120 has verified that the beginning of a transport packet has occurred, the packet start block 120 provides an output via interconnect 162 to the transport controller core 120 indicative that the beginning of a transport packet has occurred.

A first-in-first-out buffer FIFO 122 is connected to the output of the packet start block 120 and whilst the packet start block 120 is in the set up mode, the FIFO 122 is controlled by the transport controller core 124 via interconnect 160 to simply allow the input transport stream to flow through that FIFO 122. The output of that FIFO 122 is connected to a multiplexer 126 which receives a control signal from the transport controller core 124 via interconnect 164. That multiplexer 126, in the set up mode, is arranged to pass the output of the FIFO 122 therethrough to a retiming buffer 128, which is controlled by the transport controller core 124 via interconnect 166. In the set up mode of operation, the retiming buffer 128 simply outputs the transport stream received from the multiplexer 120 to the transport controller 200. In particular, the transport stream is passed by an input register 130 of the transport controller 200 to the transport controller core 124. Until the transport controller core 124 receives the packet start signal from the packet start block 120, the transport controller core 124 simply discards the received transport stream.

When the transport controller core 124 receives the signal from the packet start block 120 indicating that the beginning of the packet has been located, the transport controller core 124 provides an output signal via interconnect 160 to the FIFO 122. This control signal is such that once the transport packet header 4 has passed through the FIFO 122, the FIFO 122 is prevented from passing any more of the received transport stream therethrough. Instead, the payload 6 starts to accumulate in the FIFO 122. The transport packet header 4 is passed through the multiplexer 126 and the retiming buffer 128 to the transport controller 200. In particular, the transport packet header 4 is passed via the input register 130 to the transport controller core 124 which is arranged to process this header. The packet header 4 may contain information which can be used to process, if necessary, the transport packet payload.

The synchronization byte is used to control the timing of the programmable transport interface 10. The transport packet header 4 also contains information as to whether or not the transport packet payload 6 is scrambled or not. If the payload 6 is scrambled, then the packet header 4 contains information about which key to use the descrambling of the payload 6. The packet header 4 also contains a packet identification PID which identifies the information type(s) contained in the payload 6 and the television program(s) carried by the associated payload 6.

The transport controller core 124 checks the transport packet header 4 to determine if the payload 6 contains information on a selected television program. This selected television program may be a program to be provided by interconnect 502 to the multichannel DMA 500 for viewing by the user, for example. The selected program may be that which is to be output via the alternative stream output interface 104 of the input interface 100. In embodiments of the present invention, the alternative output stream 106 may contain the same program or a different program to that output via the interconnect 502. This will be described in more detail hereinafter.

If the transport controller core 124 determines from the packet header that the payload relates to a selected program, the transport controller core 124 determines from the header whether or not the payload requires descrambling. If it is determined that the payload is scrambled, then the transport controller core 124 is arranged to provide an output via interconnect 168 to the descrambler 132 of the input interface 100 including at least part of the necessary descramble key. The descramble key may be obtained from one or more of the following: smart card (not shown); the data SRAM via the transport controller core; and the packet header.

Once a transport controller core 124 has completed the processing of the packet header for a transport packet 1 which contains a payload 6 relating to a selected program, the transport controller core 124 provides an output signal to the FIFO 122 allowing the accumulator payload 6 to be output therefrom. The FIFO 122 in fact outputs the data stream both to the descrambler 132 and the multiplexer 126 directly. If the payload contains unscrambled data, then the descrambler 132 will not be enabled by the transport controller core 124 and the multiplexer 126 will be arranged to output the data directly received from the FIFO 122. Alternatively, if the transport controller core 124 has determined that the payload is scrambled, the descrambler 132 will be enabled. The descrambler 132 will descramble in accordance with the descramble key, at least partially, the received payload and output the descrambled payload to the multiplexer 126. In these circumstances, the multiplexer 126 is controlled by the transport controller core 124 via interconnect 164 to select the output from the descrambler 132 as its output.

The output of the multiplexer 126 is output to the retiming buffer 128 which is controlled by the transport controller core 124 via interconnect 166. The retiming buffer 128 is in fact another FIFO and is used to achieve smooth flow control for the system as a whole. The retiming buffer 128 may be controlled by the transport controller core 124 to store the data received from the multiplexer 126 until a predetermined number of bits or bytes have been stored in the retiming buffer 128. When the number of bits or bytes in the retiming buffer 128 has reached the predetermined level, then those bytes which may be output to the transport controller 200. The function of the retiming buffer 128 is two fold. Firstly, the retiming buffer 128 stores the data until such a time that the transport controller core 124 is able to receive that data. This means that the descrambler 132 can continue to descramble even if the transport controller is not ready to receive the next byte of data. Secondly, the retiming buffer is arranged to accumulate the data until the number of bits of bytes has reached a predetermined level. In some embodiments, optimum efficiency in the device is achieved if a given minimum number of bits or bytes is dealt with by the transport controller core 124 at the same time.

The payload in the retiming buffer 128 will be output to the input register 130 of the transport controller and then to the transport controller core 12.

If the transport controller core 124 determines that the data packet contains data relating to an unselected program, then this packet will be discarded. The transport controller core 124 controls the FIFO 122 so that once the header of the next packet is passed through, the FIFO 122 starts to accumulate the payload 6 at the next packet.

Generally, the alternative output stream 106 provided by the input interface 100 will only relate to one program carried by the transport stream. However, it should be appreciated that some embodiments of the present invention, more than one program may be output from the alternative output interface 104.

The transport controller core 124 is arranged to check, as previously described, each transport packet header in order to identify whether or not the given packet contains information relating to the or a selected program to be output via the alternative output 104.

When it is determined that the input packet contains information relating to a program to be output on the alternative output 104, a second FIFO 103 is used to record whether each byte clock edge contains valid data to be output via the output interface 104. When the clock edge of the byte clock is associated with valid data, a high (or low) bit is stored as the byte valid signal. If the clock edge of the signal is not associated with valid data, a low (high) value is stored as the byte valid signal. The byte valid signal is one bit for each byte. Valid data is data to be output by the alternative output. Thus, a high byte clock valid bit is stored in the second FIFO 103 for each valid clock edge. If, on the other hand, the byte is invalid, then an invalid indication (that is a low byte clock valid bit) is stored in the second FIFO 103. The second FIFO 103 thus stores the byte clock valid information which indicates if the corresponding byte is valid or not. The FIFO 103 thus records timing information on the input signal. The FIFO 103 does not store the input data itself. The output of the second FIFO 103 is input to a state machine 107 which will be discussed in more detail hereinafter. Thus, on each byte clock edge, the byte valid signal is written into the second FIFO 103.

The packet start block 120 has a further output which is input to a latency block 142. Each time the packet start block 120 identifies the synchronization byte, an output is provided to the latency block 142 which in turn provides an output to the state machine 107. The output of the latency block 142 effectively-acts as a clock signal for the output of the data via the alternative output interface 104 so that a relationship between the timing of the input packet received via input 102 and the output packet output via output interface 104 can be maintained.

The output of the first FIFO 122 is also input to a second mutliplexer 129. This second multiplexer 129 receives a second output from the descrambler 132. Depending on whether or not the program to be output via the alternative output interface 104 is scrambled or not, the output of the FIFO 122 or the descrambler 132 is selected as the output of the second multiplexer 129. The second multiplexer has a third input from a transport controller data unit 133. This unit 133 can receive data or information to be output via the alternative output from the transport controller core. The output of the data unit can therefore also be selected as an output of the second multiplexer 129. The control of the multiplexer 129 is achieved by interconnect 131 from the transport controller core 124. The output of the second multiplexer 129 is input to a third FIFO 133 which stores the bytes to be output. It should be appreciated that at this stage, the third FIFO 133 will only be storing the bytes which are to be output via the output interface 104. Bytes associated with the invalid byte clock bit will not be stored in the third FIFO. Rather only bytes associated with the high valid byte clock bits will be stored.

The state machine 107, as mentioned hereinbefore receives the outputs from the second FIFO 103 and the output from the latency block 142. The state machine may be arranged to start providing the output of bytes from a particular packet when the next packet is being received. In other words, there may be a delay of one packet between the input and output of the desired data. However, in alternative embodiments of the present invention, it is possible that the delay between the input and output of data may be less than one packet. Using the information from the second FIFO 103, the state machine 107 takes the first byte from the third FIFO 133 if the byte clock valid bit is high. That byte is output on the state machine 107. If the first byte clock valid bit is low, then the dummy output is provided with the low byte clock valid output. The first byte from the third FIFO 133 will only be output when a high valid bit is received from the second FIFO 103. This is repeated for each byte stored in the third FIFO 133. Accordingly, the output provided by the output interface 104 will consist of the bytes relating to the selected TV program with those bytes being located in the same position within a packet as in the incoming stream of data. The output may, but not necessarily also include the byte clock valid signal information.

Invalid bytes may be represented by a series of zeros, a series of 1 or any other combination of bits which indicate that the byte is not valid.

It should be appreciated that relative timing between the bytes of data received from the input interface 102 and the alternative output 104 is thus maintained.

In embodiments of the invention, the third FIFO 133 may be empty but the second FIFO 103 still has low byte valid signals stored therein. Dummy data will continue to be output from the alternative output with the low byte valid signals.

Reference will be made to FIG. 4 which shows schematically a set top box 701 which includes a programmable transport interface 10, as shown in FIG. 2. The output of the programmable transport interface 10 is connected to the MPEG-2 decoder 702. The MPEG-2 decoder 702 forms part of the set top box 701. The output of the MPEG-2 decoder provides an output of the set top box 701 and is connected, for example, to a display 704. The alternative output 104 of the PTI 10 is connected to a recorder 706 which may record the output data stream. For completeness sake, the channel decoder 708 of the set top box 701 is also shown. The output of the channel decoder 708 provides the input to the input interface 102 of the programmable transport interface 10. The MPEG-2 decoder 702 and the programmable transport interface 10 together define the source decoder. As mentioned hereinbefore, the system processor 700 is able to vary the instructions for the transport controller of the programmable interface.

It is preferred that real time processing of the input stream occur to provide the alternative output stream. However, in some embodiments of the present invention, there may be a delay therebetween. It is also preferred that there be a fixed latency between the input stream 1 of the input interface 100 and the alternative stream 106 of the input interface 100.

The alternative stream output may be connected to a recorder. However, the alternative stream output can be connected to any other suitable device such as a screen, a digital video recorder, a PC, another set top box, a network connector or the like. The alternative stream output may be connected to an IEEE 1394 interface.

Whilst embodiments of the present invention have been described in the context of an MPEG system, embodiments of the present invention can be used with other systems.

In embodiments of the present invention, the alternative output may have some encryption. However, the relative timing between the input bytes of data from the input interface and the bytes output by said alternative output is retained.

It should be appreciated that embodiments of the present invention can be used in applications other than set-top boxes. For examples, the PTI may be included in an ATM receiver or the like. Embodiments of the present invention may be applied to any suitable digital video device. Embodiments of the present invention are particularly applicable to consumer digital goods such as digital television or the like. Embodiments of the invention can be used with conditional access modules. In particular, conditional access modules can be added to a generic digital video system to customize it to receive a broadcasters (or other type of service providers) signals, descramble and decode. Embodiments of the invention can be used to process the transport stream and descramble it in a conditional access module.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device for receiving a stream of data comprising a plurality of packets, information identifying a packet beginning being included in each such packet, said device comprising:
    means for identifying the packet beginning of each such packet;
    means for identifying a first plurality of portions of data from said received stream of data and producing a first output stream;
    first output means for outputting said first output stream;
    selecting means for selecting a second plurality of portions of data from said received stream of data and producing an alternative output stream;
    determining means for determining the relative timing of said second plurality of portions of data; and
    second output means for outputting said alternative output stream, wherein the relative timing between said selected portions of data in the received stream of data and in the alternative output stream is maintained so that a fixed latency is provided between said selected portions of data in the received stream of data and the output of those said selected portions of data, said selected portions of data received by the device occurring within the plurality of packets, and said means for identifying the packet beginning of each such packet has an output for controlling the timing of the output of the selected portions of data by said second output means.

2. The device as claimed in claim 1 wherein each portion of data comprises a byte of data.

3. The device as claimed in claim 1 wherein means are provided for identifying which of said plurality of data packets comprise data to be output by said output means.

4. The device as claimed in claim 3 wherein means are provided for storing the selected portions of said data and the second output means comprises a state machine which controls the output of the selected portions of data, said state machine receives outputs from said means for storing said selected portions of data, and said means for identifying which of said plurality of data packets comprise data to be output.

5. The device as claimed in claim 1, wherein storage means are provided for storing information for each portion of each such packet indicating if the portion of data is valid or invalid.

6. The device as claimed in claim 5, wherein said information comprises a data portion valid signal.

7. The device as claimed in claim 5, wherein the storage means comprises a first-in-first-out buffer.

8. The device as claimed in claim 1, wherein means are provided for storing the selected portions of said data.

9. The device as claimed in claim 8, wherein the means for storing the selected portions of data stores only the selected portions of data.

10. The device as claimed in claim 8, wherein the means for storing the selected portions of data is a first in first out buffer.

11. The device as claimed in claim 1, wherein the input stream conforms to the MPEG-2 standard.

12. The device of claim 1 wherein the second plurality of portions of data includes audio data and video data.

13. The device of claim 1 wherein the first plurality of portions of data includes audio and video data.

14. A digital video device incorporating a device for receiving a stream of data comprising a plurality of packets, information identifying a packet beginning being included in each such packet, said device comprising:
    means for identifying the packet beginning of each such packet,
    means for identifying a first plurality of portions of data from said received stream of data and producing a first output stream;
    first output means for outputting said first output stream;

selecting means for selecting a second plurality of portions of data from said received stream of data and producing an alternative output stream;

determining means for determining the relative timing of said second plurality of portions of data; and second output means for outputting said alternative output stream, wherein the relative timing between said selected portions of data in the received stream of data and in the alternative output stream is maintained so that a fixed latency is provided between said selected portions of data in the received stream of data and the output of those said selected portions of data, said selected portions of data received by the device occurring within the plurality of packets, and said means for identifying the packet beginning of each suck packet has an output for controlling the timing of the output of said selected portions of data by said second output means.

15. The device as claimed in claim 14 wherein each portion of data comprises a byte of data.

16. The device as claimed in claim 14 wherein means are provided for identifying which of said plurality of packets comprise data to be output by said output means.

17. The device as claimed in claim 14, wherein storage means are provided for storing information for each portion of each packet indicating if the portion of data is valid or invalid.

18. The digital video device of claim 14 wherein the first plurality of portions of data includes audio and video data.

19. A method of processing a stream of data comprising the steps of:

receiving a stream of data comprising a plurality of packets, information identifying a packet beginning being included in each such packet;

identifying the packet beginning of a packet in the plurality of packets;

identifying a first plurality of portions of data from said received stream of data and producing a first output stream;

outputting said first output stream;

selecting a second plurality of portions of data from said received stream of data and producing an alternative output stream;

determining the relative timing of said second plurality of portions of data based at least in part on the identified packet beginning of the packet in the plurality of packets; and outputting the alternative output stream, wherein the relative timing between said selected portions of data in the received stream of data and in the alternative output stream is maintained so that a fixed latency is provided between said selected portions of data in the received stream of data and the output of said selected portions of data, said first and second pluralities of portions of data occurring within the packet in the plurality of packets.

20. The method of claim 19 wherein the received data stream comprises multiplexed portions of the first plurality of portions of data and the second plurality of portions of data.

21. The method of claim 19 wherein the second plurality of portions of data comprises audio and video data.

22. A device for receiving a stream of data comprising a plurality of packets, information identifying a packet beginning being included in each such packet, the device comprising:

a module configured to extract the information identifying the packet beginning of each such packet and to produce a timing control signal;

first processing circuitry configured to identify a first plurality of portions of data in the received data stream and produce a first output data stream;

second processing circuitry configured to identify a second plurality of portions of data in the received data stream and produce a second output data stream; and timing control circuitry configured to receive the timing control signal and maintain a fixed latency between said second plurality of portions of data in the received data stream and said second plurality of portions of data in the second output stream, wherein the timing control circuitry comprises a state machine.

23. The device of claim 22 wherein the first plurality of portions of data comprises audio and video data.

24. The device of claim 23 wherein the second plurality of portions of data comprises audio and video data.

25. A device for receiving a stream of data comprising a plurality of packets, information identifying a packet beginning being included in each such packet, the device comprising:

identifying circuitry configured to identify a first plurality of portions of data in the received data stream and a second plurality of portions of data in the received data stream, and to produce an output signal based on the information identifying the packet beginning of said packets;

first output circuitry configured to produce a first output stream corresponding to the first plurality of portions of data in the received data stream;

second output circuitry configured to produce a second output stream corresponding to the second plurality of portions of data in the received data stream; and timing control circuitry coupled to the output of the identifying circuitry and the second output circuitry and configured to maintain a fixed latency between the received data stream and the second output stream, wherein the timing control circuitry comprises a state machine.

26. The device of claim 25 wherein the first output stream comprises audio and video data.

27. The device of claim 26 wherein the second output stream comprises audio and video data.

28. A device for receiving a stream of data comprising a plurality of packets, each packet including information identifying a beginning of such packet and a plurality of portions of input data, the device comprising:

an input interface for identifying a first plurality of portions of data in the received data stream and a second plurality of portions of data in the received data stream, and for identifying the beginnings of the packets in the plurality of packets;

an output interface for producing a first output stream corresponding to the first plurality of portions of data in the received data stream and a second output stream corresponding to the second plurality of portions of data in the received data stream; and a timing controller coupled to the output interface and the input interface for maintaining a fixed latency between said second plurality of portions of data in the received data stream and said second plurality of portions of data in the second output stream.

29. The device of claim 28 wherein the timing controller comprises a state machine.

30. The device of claim 28 wherein the first plurality of portions of data includes audio and video data.

31. A device for receiving a stream of data comprising a plurality of data packets, the device comprising:
  means for identifying a first plurality of portions of data in the data stream and producing a first output stream;
  means for outputting the first output stream;
  means for identifying data packets in the data stream that contain data for an alternate output stream;
  means for selecting a second plurality of portions of data in the identified data packets;
  means for storing the second plurality of portions of data; and
  a state machine coupled to the means for identifying data packets and the means for storing the second plurality of portions of data, and configured to output the alternative output stream so as to maintain a fixed latency between said second plurality of portions of data in the received stream of data and said second plurality of portion of data in the alternative output stream.

32. The device of claim 31 wherein the first plurality of portions of data includes audio and video data.

33. The device of claim 32 wherein the second plurality of portions of data includes audio and video data.

* * * * *

UNITED STATES PATENT AND TRADEMARK OFFICE
CERTIFICATE OF CORRECTION

| | | |
|---|---|---|
| PATENT NO. | : 7,050,436 B1 | |
| APPLICATION NO. | : 09/589627 | |
| DATED | : May 23, 2006 | |
| INVENTOR(S) | : Howard Gurney | |

It is certified that error appears in the above-identified patent and that said Letters Patent is hereby corrected as shown below:

Title Page
Item (75), "Briston" should read --Bristol--.

Column 11
Line 15, "...identifying the packet beginning of each suck packet..." should read as --...identifying the packet beginning of each such packet...--

Column 14
Line 7, "...portion of data in the alternative output stream." should read as --...portions of data in the alternative output stream.--

Signed and Sealed this

First Day of May, 2007

JON W. DUDAS
*Director of the United States Patent and Trademark Office*